(12) United States Patent
Togo

(10) Patent No.: US 11,926,211 B2
(45) Date of Patent: Mar. 12, 2024

(54) WORKING VEHICLE

(71) Applicant: KUBOTA CORPORATION, Osaka (JP)

(72) Inventor: Manabu Togo, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 244 days.

(21) Appl. No.: 17/546,145

(22) Filed: Dec. 9, 2021

(65) Prior Publication Data

US 2022/0097520 A1 Mar. 31, 2022

Related U.S. Application Data

(63) Continuation of application No. PCT/JP2020/024419, filed on Jun. 22, 2020.

(30) Foreign Application Priority Data

Jun. 28, 2019 (JP) ................................. 2019-122527

(51) Int. Cl.
*B60K 28/04* (2006.01)
*B60K 28/00* (2006.01)

(52) U.S. Cl.
CPC ........ *B60K 28/04* (2013.01); *B60K 2028/003* (2013.01); *B60Y 2200/221* (2013.01)

(58) Field of Classification Search
CPC .. B60K 28/04; B60K 2028/003; B60K 17/08; B60K 17/28; B60Y 2200/22; B60Y 2200/221; B60R 16/0231; B60W 10/06; B60W 10/11; B60W 10/30; A01B 71/00; A01B 71/02

See application file for complete search history.

(56) References Cited

U.S. PATENT DOCUMENTS

| 5,103,951 A * | 4/1992 | Inui ..................... B60K 17/28 |
| | | 477/90 |
| 2019/0320573 A1* | 10/2019 | Miyazaki ............... A01B 63/10 |

FOREIGN PATENT DOCUMENTS

| EP | 2 412 591 A2 | 2/2012 |
| JP | 2008-063969 A | 3/2008 |
| JP | 2011-017272 A | 1/2011 |
| JP | 2012-030616 A | 2/2012 |
| JP | 2013-148036 A | 8/2013 |

OTHER PUBLICATIONS

Official Communication issued in International Patent Application No. PCT/JP2020/024419, dated Aug. 25, 2020.

* cited by examiner

*Primary Examiner* — Orlando Bousono
(74) *Attorney, Agent, or Firm* — Keating & Bennett, LLP

(57) ABSTRACT

A working vehicle includes a prime mover, a driver's seat selectively set in either a first posture where a driver can sit thereon or a second posture where the driver cannot sit thereon, a speed controller to receive power from the prime mover and perform a speed-changing of the power, a PTO shaft to receive the speed-changed power from the speed controller, a posture switch to detect whether the driver's seat is set in the first or second posture, a parking switch to detect parking of a vehicle body, and a first actuator. During driving of the prime mover, the first actuator maintains the driving of the prime mover when both the parking and the driver's seat set in the second posture are detected, and stops the driving of the prime mover when neither the parking nor the driver's seat set in the second posture is detected.

6 Claims, 5 Drawing Sheets

WORKING VEHICLE

CROSS REFERENCE TO RELATED APPLICATIONS

This application is a continuation application of International Application No. PCT/JP2020/024419, filed on Jun. 22, 2020, which claims the benefit of priority to Japanese Patent Application No. 2019-122527, filed on Jun. 28, 2019. The entire contents of each of these applications are hereby incorporated herein by reference.

BACKGROUND OF THE INVENTION

1. Field of the Invention

The present invention relates to a working vehicle.

2. Description of the Related Art

A technique disclosed in Japanese Unexamined Patent Publication No. 2012-30616 is known, which is a technique for driving a Power Take-Off (PTO) shaft that is configured to be driven by an engine power in a working vehicle.

A tractor disclosed in Japanese Unexamined Patent Publication No. 2012-30616 includes a PTO selecting switch to turn on/off driving of the PTO shaft, a detection switch to detect a state of a parking brake, and a controller to stop an engine, that is, to control the driving of the PTO shaft according to states of the PTO selecting switch and the detection switch. When the controller detects that the PTO selecting switch is turned on and the detection switch detects activation of the parking brake, the controller maintains the driving of the PTO shaft without stopping the engine.

SUMMARY OF THE INVENTION

In Japanese Unexamined Patent Publication No. 2012-30616, the PTO shaft is driven under a condition that the detection switch detects parking of the tractor, so that an operator can perform work while the tractor is parked. If the PTO shaft can be driven while the tractor is parked, it is convenient for the operator and others. In recent years, a driving device for the PTO shaft that includes further developed functions has been desired.

Preferred embodiments of the present invention provide working vehicles each allowing an operator to perform a work outside a vehicle body by driving a PTO shaft while the vehicle body is parked.

A working vehicle according to a preferred embodiment of the present invention includes a prime mover, a driver's seat selectively set in either a first posture where a driver can sit on the driver's seat or a second posture where the driver cannot sit on the driver's seat, a speed controller to receive power from the prime mover and to change a speed of the power, a PTO shaft to receive the speed-changed power output from the speed controller, a posture switch to detect whether the driver's seat is set in the first posture or the second posture, a parking switch to detect parking of a vehicle body, and a first actuator to, during driving of the prime mover, maintain the driving of the prime mover when both the parking and the driver's seat set in the second posture are detected, and stop the driving of the prime mover when neither the parking nor the driver's seat set in the second posture is detected.

A working vehicle according to a preferred embodiment of the present invention may further include a speed-changing switch to be turned on to allow the speed-changing performed by the speed controller, and to be turned off to disable the speed controller from performing the speed-changing. The first actuator is operable to maintain the driving of the prime mover when the speed controller is turned off, and to stop the driving of the prime mover when the speed controller is turned on.

A working vehicle according to a preferred embodiment of the present invention may further include an on-off switch to be turned on to allow driving of the PTO shaft, and to be turned off to disable the PTO shaft from driving, a key switch to issue an instruction to start the prime mover, a second actuator to output an allowance signal when the PTO shaft is disabled from driving and the speed-changing switch is turned off, and a third actuator operably connected to the second actuator to perform the starting of the prime mover when the instruction for the starting of the prime mover is issued and the allowance signal is input to the third actuator.

The first actuator is operable to maintain the driving of the prime mover when the allowance signal is input to the first actuator during the driving of the prime mover.

The first actuator may be a relay including a first input terminal, a second input terminal and a first output terminal. The second actuator may be a relay including a third input terminal, a fourth input terminal and a second output terminal. The third actuator may be a relay including a fifth input terminal, a sixth input terminal and a third output terminal. A first line connecting the first actuator and the second actuator to each other is connected to the first input terminal. An electric source line is connected to the second input terminal. An output terminal of the on-off switch is connected to the third input terminal. An output terminal of the speed-changing switch is connected to the fourth input terminal. An output terminal of the key switch is connected to the fifth input terminal. A second line connected to the second output terminal is connected to the sixth input terminal. A stopper to stop the prime mover is connected to the first output terminal. A starter to perform the starting of the prime mover is connected to the third output terminal.

A working vehicle according to a preferred embodiment of the present invention may further include a seat switch to detect sitting of a driver on the driver's seat, and a notifier to notify information in correspondence to a predetermined condition. The notifier notifies the information when the speed-changing switch is turned off and the sitting of the driver is not detected.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
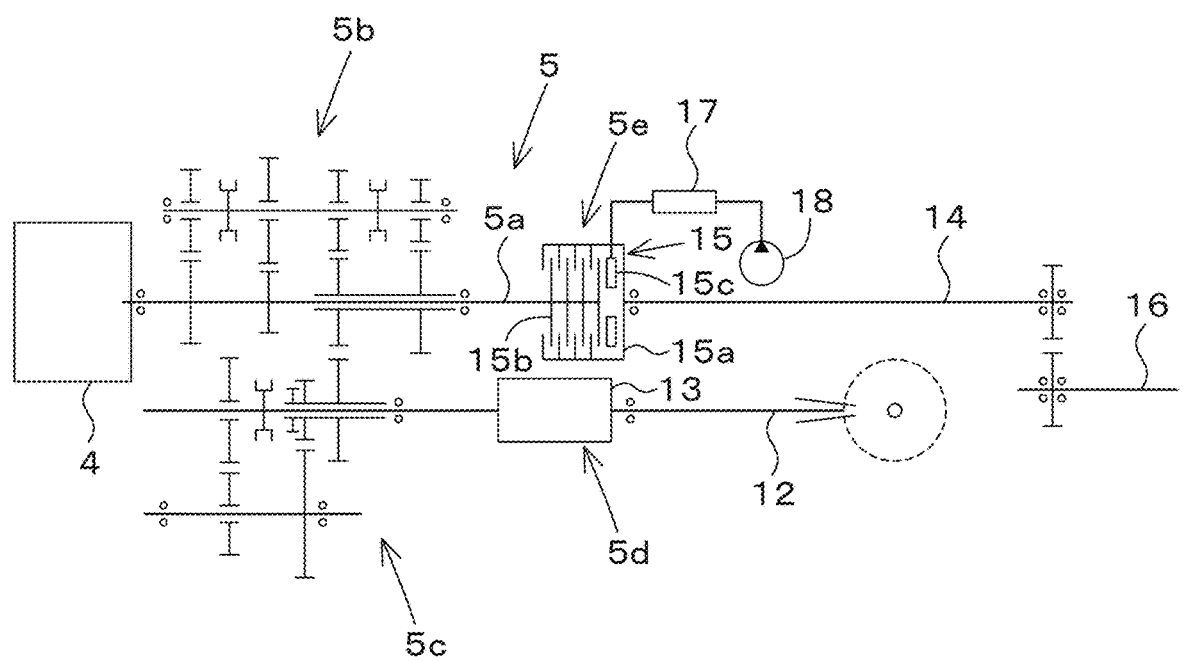
FIG. 1 is a schematic view of a whole of a transmission device.

The preferred embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, preferred embodiments of the present invention will be described below.

Figure 5:
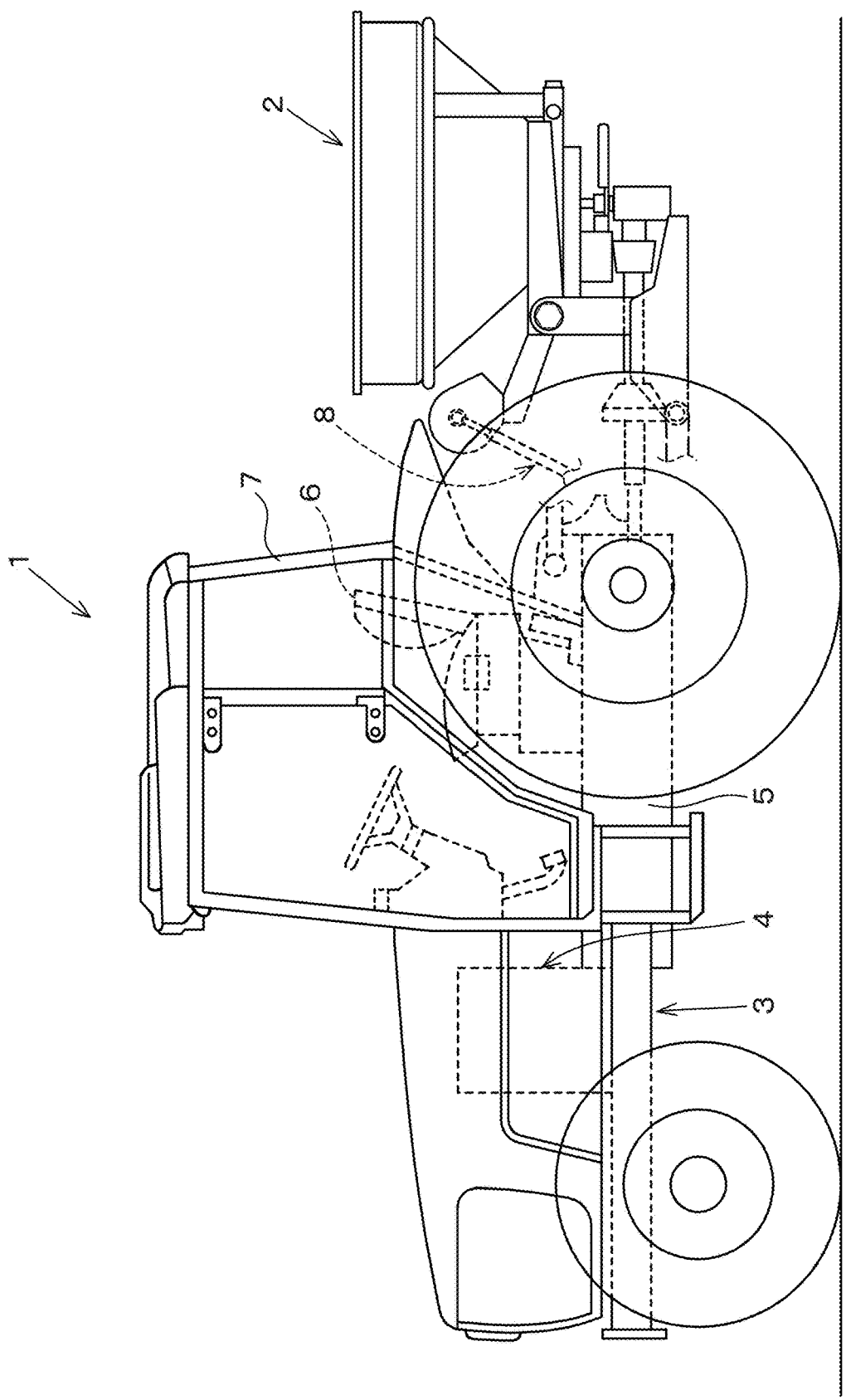
FIG. 5 is a whole view of a working vehicle.

FIG. 5 shows an overall view of a working vehicle 1 according to a preferred embodiment of the present invention. The working vehicle 1 is not limited to a tractor, but may be an agricultural machine such as a combine harvester or a rice transplanter.

First, an overall configuration of the tractor 1 will be explained.

As shown in FIG. 5, the tractor 1 includes a traveling vehicle body (hereinafter referred to as a vehicle body) 3 having wheels, a prime mover 4, and a speed controller 5. The prime mover 4 is a diesel engine, a gasoline engine, an electric motor, or the like. In this preferred embodiment, the prime mover 4 is the diesel engine (hereinafter referred to as an engine).

The vehicle body 3 includes a driver's seat 6 and a cabin 7 surrounding the driver's seat 6 at a rear portion of the vehicle body 3, a connecting portion 8 including a three-point linkage mechanism or the like. A working device 2 can be attached to and detached from the connecting portion 8. The working device 2, such as a cultivator, fertilizer applicator, chemical sprayer, or the like, can be connected to the connecting portion 8 to be towed by the vehicle body 3.

As shown in FIG. 1, the speed controller 5 includes a main shaft (propulsion shaft) 5a, a main speed-changing unit 5b, a sub speed-changing unit 5c, a shuttle unit 5d, and a PTO power transmission unit 5e. The propulsion shaft 5a is rotatably supported by a housing case of the speed controller 5, and a power from a crankshaft of the prime mover 4 is transmitted to the propulsion shaft 5a. The main speed-changing unit 5b includes a plurality of gears and a shifter to change a connection between the gears. The main speed-changing unit 5b appropriately changes the connection (engagement) between the plurality of gears with the shifter to change the rotation input from the propulsion shaft 5a, thus outputting the changed rotation (changing a speed).

Similar to the main speed-changing unit 5b, the sub speed-changing unit 5c includes a plurality of gears and a shifter to select which gears to be drivingly connected. The sub speed-changing unit 5c appropriately changes the connection (engagement) between the plurality of gears with the shifter to change the rotation input from the main speed-changing unit 5b, thus outputting the changed rotation (changing a speed).

The shuttle unit 5d includes a shuttle shaft 12 and a forward/backward-traveling switching unit 13. A power output from the sub speed-changing unit 5c is transmitted to the shuttle shaft 12 through the gears and the like. The forward/backward-traveling switching unit 13 includes, for example, a hydraulic clutch and the like, and engages or disengages the hydraulic clutch to switch a rotational direction of the shuttle shaft 12, i.e., a traveling direction of the tractor 1 between the forward traveling and the backward traveling.

The PTO power transmission unit 5e includes a PTO propulsion shaft 14 and a PTO clutch 15. The PTO propulsion shaft 14 is rotatably supported and capable of transmitting a power from the propulsion shaft 5a. The PTO propulsion shaft 14 is connected to the PTO shaft 16 via a gear and the like. The PTO clutch 15 is a clutch to selectively perform a first operation in which a power of the propulsion shaft 5a is transmitted to the PTO propulsion shaft 14 or a second operation in which the power of the propulsion shaft 5a is not transmitted to the PTO propulsion shaft 14. Specifically, the PTO clutch 15 is including a hydraulic clutch and includes a housing 15a that can rotate integrally with the PTO propulsion shaft 14, a clutch member 15b that can rotate integrally with the propulsion shaft 5a, and a piston 15c that can be moved in the housing 15a by hydraulic fluid.

Accordingly, when the piston 15c is moved and the clutch member 15b is joined to the housing 15a, the PTO clutch 15 shifts to perform the first operation, a power from the prime mover 4 is transmitted to the PTO propulsion shaft 14 via the propulsion shaft 5a and the PTO clutch 15, and then a power of the PTO propulsion shaft 14 is transmitted to the PTO shaft 16. That is, the PTO shaft 16 is driven by the power of the prime mover 4 via the speed controller 5. On the other hand, when the piston 15c is moved to separate the clutch member 15b from the housing 15a, the PTO clutch shifts to perform the second operation, the power of the propulsion shaft 5a is not transmitted to the PTO propulsion shaft 14, and thus it is isolated from the power of the propulsion shaft 5a. The transmission or disconnection of the power by the PTO clutch 15 is performed by an actuation valve 17 (switching valve) connected to the piston 15c via a fluid passage. A pump 18 to supply hydraulic fluid (oil) is connected to the actuation valve 17.

Figure 2:
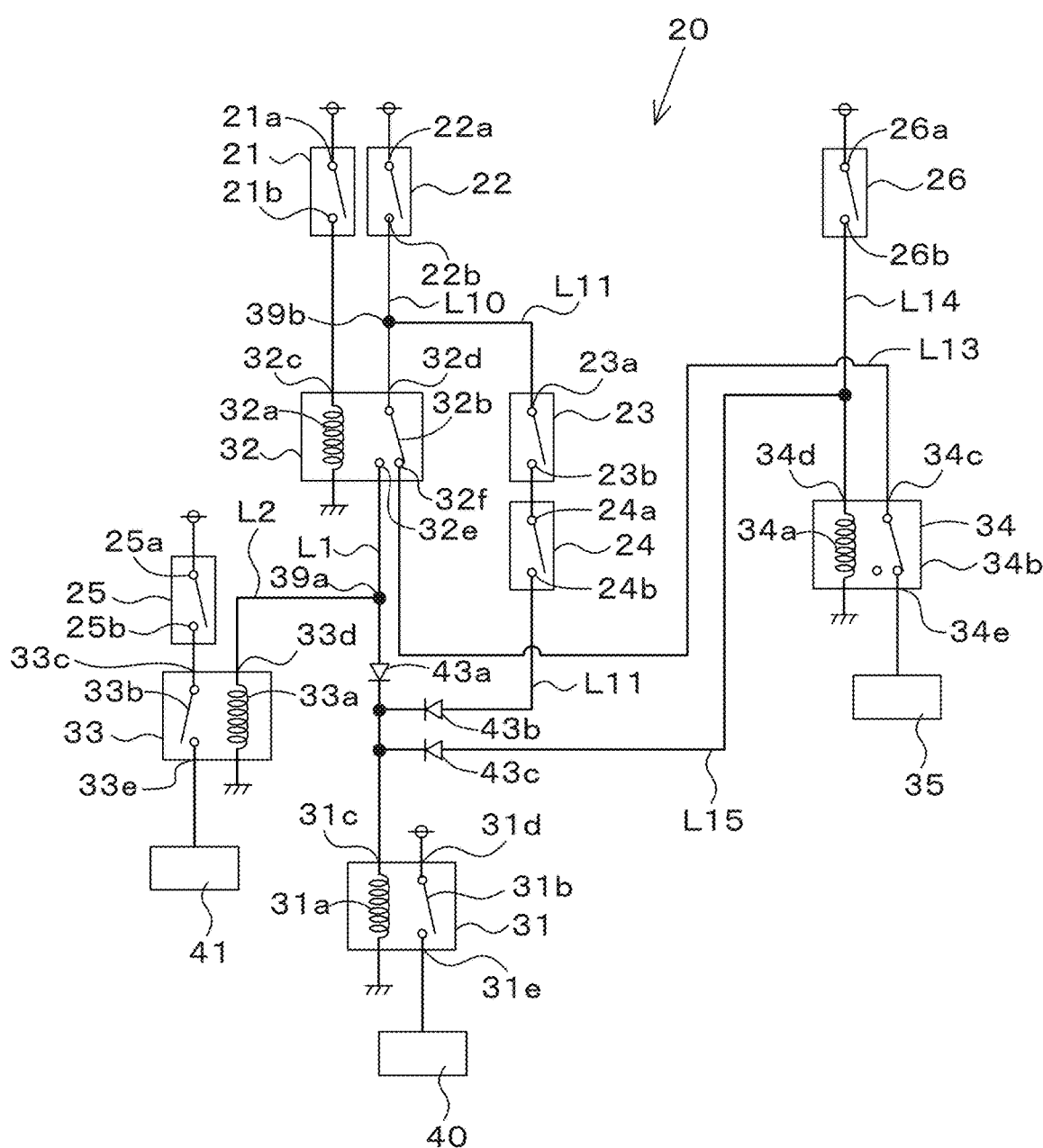
FIG. 2 is a whole view of a control circuit of a PTO shaft.

FIG. 2 shows the control circuit to drive the PTO shaft.

The control circuit 20 for the PTO shaft includes an on-off switch 21, a speed-changing switch 22, a parking switch 23, a posture switch 24, a key switch 25, and a seat switch 26.

The on-off switch 21 can be shifted between an on state and an off state so as to selectively allow or disable the driving of the PTO shaft 16. For example, when the on-off switch 21 is in the on state (a contact is closed), the PTO shaft 16 is "disabled" from driving, and when the on-off switch 21 is in the off state (the contact is opened), the PTO shaft 16 is "allowed" to drive. The on-off switch 21 is disposed in the vicinity of the driver's seat 6 and can be operated by an operator (driver). When the on-off switch 21 is shifted to the off state, the actuation valve 17 is shifted to a predetermined position, the PTO clutch 15 performs the first operation, and the PTO shaft 16 is driven (rotated). On the other hand, when the on-off switch 21 is shifted to the on state, the actuation valve 17 is shifted to another predetermined position, the PTO clutch 15 performs the second operation, and the PTO shaft 16 stops being driven (rotated).

The speed-changing switch 22 can be shifted between an on state and an off state so as to selectively allow or disable the speed-changing of the speed controller 5. When the speed-changing switch 22 is in the on state (a contact is closed), the speed controller 5 is disabled from performing the speed-changing, and when the speed-changing switch 22 is in the off state (the contact is opened), the speed controller 5 is allowed to perform the speed-changing. The speed-changing switch 22 is disposed in the vicinity of the driver's seat 6 and can be operated by an operator (driver). When the speed-changing switch 22 is shifted to the off state, the speed-changing is performed according to an operation of a speed-changing operation member (e.g., a speed-changing operation switch, a speed-changing operation lever) to perform the speed-changing by operating either the main speed-changing unit 5b or the sub speed-changing unit 5c. When the speed-changing switch 22 is shifted to the on state, the speed-changing is not performed even if the speed-changing operation member is operated.

The parking switch 23 is a switch to detect parking of the traveling vehicle body (vehicle body) 3. Specifically, the parking switch 23 is switchable to be on or off. When a parking (parking-brake) lever swingably supported by the vehicle body 3 is shifted to a position to brake the vehicle body 3 (a braking position), the parking switch 23 is switched to its on state (a contact is closed) in accordance with the swinging of the parking lever, and detects the parking. In addition, when the parking lever 3 is shifted to a position to release the braking of the vehicle body 3 (a releasing position), the parking switch 23 is switched to its off state (the contact is opened) in accordance with the swinging of the parking lever, and does not detect the parking.

Figure 3:
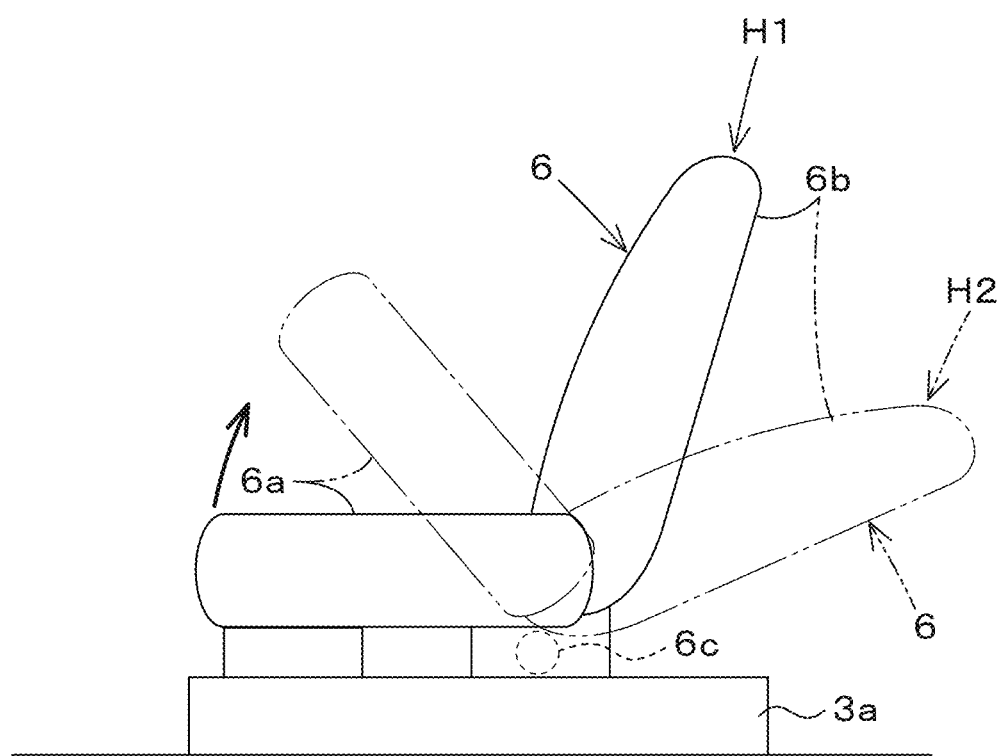
FIG. 3 is a side view of an operator seat.

The posture switch 24 is a switch to detect a state of the driver's seat 6 as shown in FIG. 3, the posture switch 24 is a switch to detect whether the driver's seat 6 is in a first posture H1 to allow a driver to sit thereon or in a second posture H2 to disable the driver from sitting thereon. Specifically, a seat portion 6a and backrest 6b of the driver's seat 6 are pivotable on a lateral axis 6c supported by the vehicle body 3 (driver's seat stand 3a). When the seat portion 6a is parallel or substantially parallel with an upper surface of the driver's seat stand 3a and the driver is allowed to be seated on the seat portion (in the first posture H1), the posture switch 24 is shifted to its off state, and when the seat portion 6a is perpendicular or substantially perpendicular to the upper surface of the driver's seat stand 3a and the driver is disabled from being seated on the seat portion (in the second posture H2), the posture switch 24 is shifted to its on state.

The key switch 25 is shiftable to an on state to instruct starting (driving) of the prime mover 4 or to an off state. For example, when the key switch 25 is shifted to the on state (a contact is closed), the key switch 25 is in the state of instructing the driving of the prime mover 4, and when the key switch 25 is shifted to the off state (the contact is opened), the key switch 25 is in the state of not-instructing the driving of the prime mover 4. The key switch 25 is disposed in the vicinity of the driver's seat 6 and can be operated by an operator (driver).

The seat switch 26 is a switch to detect the operator seated on the driver's seat 6. For example, the seat switch 26 is shiftable to an on state or an off state. The seat switch 26 is disposed in a portion (seat portion, backrest) of the driver's seat 6, below the seat, or the like. When the operator is seated on the seat, the seat switch 26 is shifted to the on state (a contact is closed) to detect the seating. In addition, when the operator gets off the seat, the seat switch 26 is shifted to the off state (the contact is opened) to detect that the operator is not seated on the seat.

The control circuit 20 for the PTO shaft includes a first actuator 31, a second actuator 32, a third actuator 33, a fourth actuator 34, and a notifier 35. The first actuator 31, the second actuator 32, the third actuator 33, and the fourth actuator 34 are, for example, contact relays, non-contact relays, sequencers, or the like.

After the driving of the prime mover is started, the first actuator 31 maintains the driving of the prime mover 4 while the parking is detected and the second posture H2 is detected, and the first actuator 31 stops the driving of the prime mover 4 when neither the parking nor the second posture H2 is detected. The first actuator 31 is the contact relay including a coil portion 31a, a switch portion 31b, a first input terminal 31c, a second input terminal 31d, and a first output terminal 31e. The first actuator (relay) 31 may be a "single-stable type" relay in which the switch portion 31b is shifted to an on state when the coil portion 31a is magnetized, may be a "latching type" relay in which the switch portion 31b is shifted to the on state with the magnetization of the coil portion 31a being held (latched), or may be any other relay.

In the first actuator 31, when an allowance signal, which is a predetermined voltage, electrically energizes the coil portion 31a from the first input terminal 31c and then the switch portion 31b is shifted to the on state (when the contact is closed), the stopper 40 connected to the first output terminal 31e is continuously actuated to maintain the driving of the prime mover 4. On the other hand, when the first actuator 31 does not electrically energize the coil portion 31a and the switch portion 31b is shifted to the off state (when the contact is opened), an electric power supply to the stopper 40 is stopped, and the prime mover 4 stops. That is, the first actuator 31 maintains the driving of the prime mover 4 when the allowance signal is input to the first actuator 31 after the prime mover 4 has started to be driven. The stopper 40 includes an engine-stopping solenoid, which maintains the driving of the prime mover 4 when it is magnetized (when it is supplied with electric power), and which stops the prime mover 4 when it is demagnetized (when it is not supplied with the electric power).

The second actuator 32 outputs the allowance signal when the driving of the PTO shaft 16 is disabled (ON) and the speed-changing switch 22 is shifted to the off state (ON). The second actuator 32 is a contact relay including a coil portion 32a, a switch portion 32b, a third input terminal 32c, a fourth input terminal 32d, and a second output terminal 32e. The second actuator (relay) 32 may be a single-stable type relay, a latching type relay, or any other relay.

When the coil portion 32a is electrically energized by electricity from the third input terminal 32c and the switch portion 32b is shifted to the on state, the second actuator 32 connects the fourth input terminal 32d to the second output terminal 32e, and outputs, from the second output terminal 32e, the allowance signal indicated by a predetermined voltage. On the other hand, when the coil portion 32a is not electrically energized and the switch portion 32b is shifted to the off state, the second actuator 32 connects the fourth input terminal 32d to the output terminal 32f, and outputs a notification signal.

The third actuator 33 is connected to the second actuator 32 and starts the prime mover 4 when the allowance signal is input to the third actuator 33 under an instruction to start the prime mover 4. The third actuator 33 is a contact relay including a coil portion 33a, a switch portion 33b, a fifth input terminal 33c, a sixth input terminal 33d, and a third output terminal 33e. The third actuator (relay) 33 may be a single-stable type relay, a latching type relay, or any other relay.

When the coil portion 33a is electrically energized by electricity from the sixth input terminal 33d of the third actuator 33, the switch portion 33b is shifted to the on state (a contact is closed) and a starter 41 is activated to start the prime mover 4. On the other hand, when the coil portion 33a of the third actuator 33 is not electrically energized, the switch portion 33b is shifted to the off state (the contact is opened), the starter 41 is not activated, and thus the prime mover 4 is not started.

The fourth actuator 34 is connected to the seat switch 26 and outputs a notification signal when the seat switch 26 is in the on state. The fourth actuator 34 is a contact relay including a coil portion 34a, a switch portion 34b, a seventh input terminal 34c, an eighth input terminal 34d, and a fourth output terminal 34e. The fourth actuator (relay) 34 may be a single-stable type relay, a latching type relay, or any other relay.

When the coil portion 34a is electrically energized by electricity from the eighth input terminal 34d of the fourth actuator 34, the switch portion 34b is shifted to the on state (a contact is closed), and thus no notification signal is output. On the other hand, when the coil portion 34a of the fourth actuator 34 is not electrically energized, the switch portion 34b is shifted to the off state (the contact is opened), and then the notification signal is output from the fourth output terminal 34e.

The notifier 35 is operable to execute a notification according to a predetermined condition, and is, for example, a speaker that generates sound. The notifier 35 outputs a notification when the notification signal output from the fourth actuator 34 is input to the notifier 35. That is, the notifier 35 executes a notification when the input switch 21 is in the off state, the speed-changing switch 22 is in the on state, and the seat switch 26 is in the on state (the seating is detected). It is desirable that the notifier 35 includes a timer. That is, the notifier 35 generates a sound for at least several seconds after the electrically energizing of the coil portion 34a is stopped.

Next, connections between the switches (on-off switch 21, speed-changing switch 22, parking switch 23, posture switch 24, key switch 25, seat switch 26), the actuators (first actuator 31, second actuator 32, third actuator 33, fourth actuator 34), and the notifier 35 will be described.

The first input terminal 31c of the first actuator 31 is connected to the second output terminal 32e of the second actuator 32 via the first line L1. The second input terminal 31d of the first actuator 31 is connected to a power supply system. The first output terminal 31e of the first actuator 31 is connected to the stopper 40.

The input terminal 21a of the on-off switch 21 and the input terminal 22a of the speed-changing switch 22 are connected to the power supply system. The output terminal 21b of the on-off switch 21 is connected to the third input terminal 32c of the second actuator 32, and the output terminal 22b of the speed-changing switch 22 is connected to the fourth input terminal 32d of the second actuator 32.

The second output terminal 32e of the second actuator 32 is connected to the third actuator 33 via a second line L2 connecting the second output terminal 32e to the sixth input terminal 33d of the third actuator 33. The first line L1 includes a portion between the second output terminal 32e of the second actuator 32 and a branching portion 39a, and the portion defines and functions as a line (common line) shared with the second line L2. The power supply system is connected to the input terminal 25a of the key switch 25, and the fifth input terminal 33c of the third actuator 33 is connected to the output terminal 25b.

A line L11 branches, via a branch 39b, from a line L10 which connects the output terminal 22b of the speed-changing switch 22 to the fourth input terminal 32d of the second actuator 32. The parking switch 23 and the posture switch 24 are connected in series to the line L11, and the line L11 is connected to the first line L1. That is, an input terminal 23a of the parking switch 23 is connected to an intermediate portion of the line L11. An output terminal 23b of the parking switch 23 is connected to the input terminal 24a of the posture switch 24 via the line L11. The output terminal 24b of the posture switch 24 is connected to the first line L1 via the line L11.

Accordingly, even in a state where the speed controller is disabled from performing the speed-changing (the speed-changing switch 22 is in the on state), the switch portion 31b of the first actuator 31 can be shifted to the on state when the parking switch 23 is in the on state and the posture switch 24 is in the on state, thus maintaining the driving of the prime mover 4.

The output terminal 32f of the second actuator 32 is connected to the seventh input terminal 34c of the fourth actuator 34 via a line L13. The input terminal 26a of the seat switch 26 is connected to the power supply system. The output terminal 26b of the seat switch 26 is connected to the eighth input terminal 34d of the fourth actuator 34 via a line L14. In addition, the output terminal 26b of the seat switch 26 is connected to the first line L1 via a line L15. Accordingly, also when the speed controller 5 is disabled from performing the speed-changing (the speed-changing switch 22 is in the on state) and the seat switch 26 is shifted to the on state, the driving of the prime mover 4 can be maintained.

It is preferable to provide diodes 43a, 43b, and 43c, each of which supplies electric current (signal) in one direction, on the line (first line) L1, line 11, and line 15, respectively.

Figure 4:
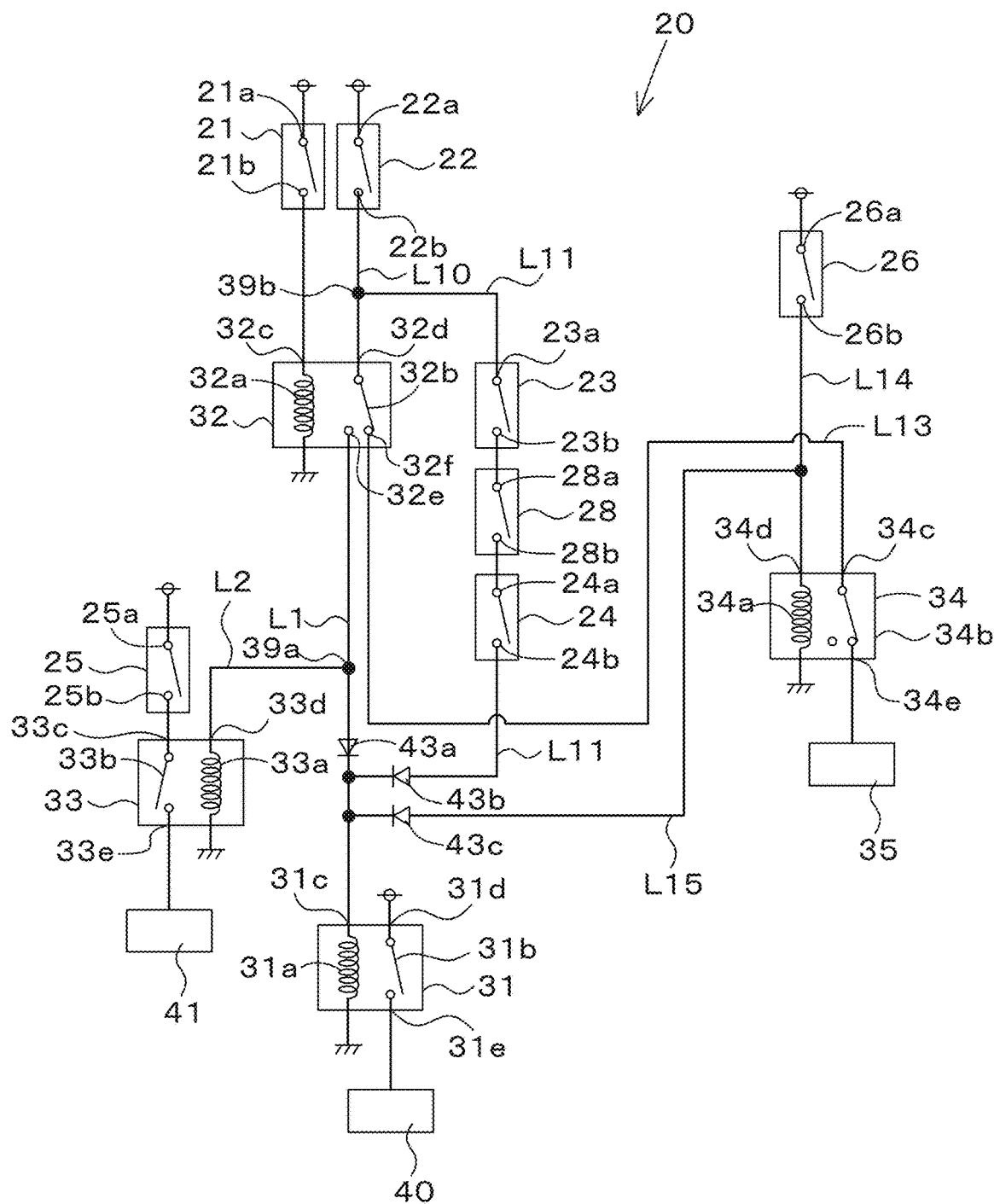
FIG. 4 is a whole view of a control circuit according to a modified example of FIG. 2.

As shown in FIG. 4, a PTO selecting switch 28 may be provided on the line L11. The PTO selecting switch 28 is a switch to selectively supply the power of the PTO shaft 16 to either a front portion of the vehicle body 3 or a rear portion of the vehicle body 3. The PTO selecting switch 28 is in the on state (a contact is closed) when the PTO shaft 16 is set to supply power to the front, and is in the off state (the contact is opened) when the PTO shaft 16 is set to supply power to the rear. The input terminal 28a of the PTO selecting switch 28 is connected to the output terminal 23b of the parking switch 23, and the input terminal 28b is connected to the input terminal 24a of the posture switch 24.

According to the above description, in a case where the PTO selecting switch 28 is in the on state in addition to a case where the vehicle switch 23 is in the on state and the posture switch 24 is in the on state, the driving of the prime mover 4 can be maintained.

In the above-described preferred embodiment, the PTO power transmission unit 5e includes a clutch shiftable between an engaged state in which a power of the propulsion shaft 5a is transmitted to the PTO propulsion shaft 14 and a disengaged state in which the power of the propulsion shaft 5a is not transmitted to the PTO propulsion shaft 14; however, the PTO power transmission unit 5e may include a speed-changing mechanism to change a rotation speed of the PTO shaft 16 (PTO rotation speed) in multiple steps in the engaged state. For example, the PTO power transmission unit 5e switches the PTO rotation speed between the first speed, which is a low speed, and the second speed, which is a high speed. In this case, the on-off switch 21 can be shifted to three levels: a first speed, a second speed, and a neutral position (neutral). In the circuits in FIGS. 2 and 4, the on-off switch 21 is in the on state (a contact is closed) when in the neutral position, and is in the off state (the contact is opened) when in the first speed and the second speed.

The working vehicle 1 includes the prime mover 4, the driver's seat 6 selectively set in either the first posture H1 where a driver can sit on the driver's seat 6 or the second posture H2 where the driver cannot sit on the driver's seat 6, the speed controller 5 to receive power from the prime mover 4 and to perform a speed-changing of the power, the PTO shaft 16 to receive the speed-changed power output from the speed controller 5, the posture switch 24 to detect whether the driver's seat 6 is set in the first posture H1 or the second posture H2, the parking switch 23 to detect parking of the vehicle body, and the first actuator 31 to, during driving of the prime mover 4, maintain the driving of the prime mover 4 when both the parking and the driver's seat 6 set in the second posture H2 are detected and stop the driving of the prime mover 4 when neither the parking nor the driver's seat 6 set in the second posture H2 is detected. According to this configuration, since the driving of the prime mover 4 is continued when the driver is in the second posture H2 in which the driver cannot be seated on the driver's seat and the parking is detected, a work can be performed while the driver is outside the vehicle body 3 and the PTO shaft 16 is being driven. That is, an operator can perform the work outside the vehicle body by driving the PTO shaft while the vehicle body is parked.

The working vehicle 1 further includes the speed-changing switch 22 to be turned on to allow the speed-changing performed by the speed controller 5, and to be turned off to disable the speed controller 5 from performing the speed-changing. The first actuator 31 is operable to maintain the driving of the prime mover 4 when the speed controller 5 is turned off, and to stop the driving of the prime mover 4 when the speed controller 5 is turned on. According to this configuration, the driving of the prime mover 4 is stopped when the speed-changing of the speed controller 5 enters an on-state, while an outside work can be performed by driving the PTO shaft when the speed-changing of the speed controller 5 enters an off-state, that is, when the vehicle body 3 is securely parked.

The working vehicle 1 further includes the on-off switch 21 to be turned on to allow driving of the PTO shaft 16, and to be turned off to disable the PTO shaft 16 from driving, the key switch to issue an instruction for start of the prime mover 4, the second actuator 32 to output an allowance signal when the PTO shaft 16 is disabled from driving and the speed-changing switch 22 is turned off, and the third actuator 33 operably connected to the second actuator 32 to perform the starting of the prime mover 4 when the instruction for the starting of the prime mover 4 is issued and the allowance signal is input to the third actuator 33. According to this configuration, the prime mover 4 can be started when the PTO shaft 16 is not driven and the traveling is not performed.

The first actuator 31 is operable to maintain the driving of the prime mover 4 when the allowance signal is input to the first actuator 31 during the driving of the prime mover 4. According to this configuration, when the PTO shaft is driven during the driving of the prime mover 4, the PTO shaft can be continuously driven.

The first actuator 31 may be a relay including the first input terminal 31c, the second input terminal 31d and the first output terminal 31e. The second actuator 32 may be a relay including the third input terminal 32c, the fourth input terminal 32d and the second output terminal 32e. The third actuator 33 may be a relay including the fifth input terminal 33c, the sixth input terminal 33d and the third output terminal 33e. The first line L1 connecting the first actuator 31 and the second actuator 32 to each other is connected to the first input terminal 31c. The electric source line is connected to the second input terminal 31d. The output terminal 21b of the on-off switch 21 is connected to the third input terminal 32c. The output terminal 22b of the speed-changing switch 22 is connected to the fourth input terminal 32d. The output terminal 25b of the key switch 25 is connected to the fifth input terminal 33c. The second line L2 connected to the second output terminal 32e is connected to the sixth input terminal 33d. The stopper 40 to stop the prime mover 4 is connected to the first output terminal 31e. The starter 41 to perform the starting of the prime mover 4 is connected to the third output terminal 33e. According to this configuration, the starting, stopping, and continuous driving of the prime mover 4 can be performed stably and reliably by a sequential operation with the relay.

The working vehicle 1 further includes the seat switch 26 to detect sitting of a driver on the driver's seat 6, and the notifier 35 to notify information in correspondence to a predetermined condition. The notifier 35 notifies the information when the speed-changing switch 22 is turned off and the sitting of the driver is not detected. According to this configuration, it is easy to inform that the traveling is not being performed and a driver is not seated on the driver's seat.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

All combinations of the configurations described in the first to fourth preferred embodiments above can be implemented as preferred embodiments of the present invention.

What is claimed is:

1. A working vehicle, comprising:
   a prime mover;
   a driver's seat selectively set in either a first posture where a driver can sit on the driver's seat or a second posture where the driver cannot sit on the driver's seat;
   a speed controller to receive power from the prime mover and to perform a speed-changing of the power;
   a Power Take-Off (PTO) shaft to receive speed-changed power output from the speed controller;
   a posture switch to detect whether the driver's seat is set in the first posture or the second posture;
   a parking switch to detect parking of a vehicle body; and
   a first actuator to, during driving of the prime mover, maintain the driving of the prime mover when both the parking and the driver's seat set in the second posture are detected and stop the driving of the prime mover when neither the parking nor the driver's seat set in the second posture is detected.

2. The working vehicle according to claim 1, further comprising:
   a speed-changing switch to be turned on to allow the speed-changing performed by the speed controller, and to be turned off to disable the speed controller from performing the speed-changing; wherein
   the first actuator is operable to maintain the driving of the prime mover when the speed controller is turned off and to stop the driving of the prime mover when the speed controller is turned on.

3. The working vehicle according to claim 2, further comprising:
   an on-off switch to be turned on to allow driving of the PTO shaft, and to be turned off to disable the PTO shaft from driving;
   a key switch to issue an instruction for start of the prime mover; and
   a second actuator to output an allowance signal when the PTO shaft is disabled from driving and the speed-changing switch is turned off; and
   a third actuator operably connected to the second actuator to perform the starting of the prime mover when the instruction for the starting of the prime mover is issued and the allowance signal is input to the third actuator.

4. The working vehicle according to claim 3, wherein the first actuator is operable to maintain the driving of the prime mover when the allowance signal is input to the first actuator during the driving of the prime mover.

5. The working vehicle according to claim 4, wherein:
the first actuator is a relay including a first input terminal, a second input terminal and a first output terminal;
the second actuator is a relay including a third input terminal, a fourth input terminal and a second output terminal;
the third actuator is a relay including a fifth input terminal, a sixth input terminal and a third output terminal;
a first line connecting the first actuator and the second actuator to each other is connected to the first input terminal;
an electric source line is connected to the second input terminal;
an output terminal of the on-off switch is connected to the third input terminal;
an output terminal of the speed-changing switch is connected to the fourth input terminal;
an output terminal of the key switch is connected to the fifth input terminal;
a second line connected to the second output terminal is connected to the sixth input terminal;
a stopper to stop the prime mover is connected to the first output terminal; and
a starter to perform the starting of the prime mover is connected to the third output terminal.

6. The working vehicle according to claim 2, further comprising:
a seat switch to detect sitting of a driver on the driver's seat; and
a notifier to notify information in correspondence to a predetermined condition; wherein
the notifier is operable to notify the information when the speed-changing switch is turned off and the sitting of the driver is not detected.

* * * * *